(12) United States Patent
Simula et al.

(10) Patent No.: US 7,137,675 B1
(45) Date of Patent: Nov. 21, 2006

(54) ROAD WHEEL FOR TRACKED VEHICLES

(75) Inventors: Glen R Simula, Hancock, MI (US); Steven J Tarnowski, Calumet, MI (US); Adam C Johnson, Houghton, MI (US)

(73) Assignee: GS Engineering, Inc., Houghton, MI (US)

( * ) Notice: Subject to any disclaimer, the term of this patent is extended or adjusted under 35 U.S.C. 154(b) by 0 days.

(21) Appl. No.: 10/944,296

(22) Filed: Sep. 17, 2004

Related U.S. Application Data

(60) Provisional application No. 60/504,531, filed on Sep. 19, 2003.

(51) Int. Cl.
*B62D 55/12* (2006.01)
*B60B 23/00* (2006.01)

(52) U.S. Cl. ...................................... 305/194; 305/137
(58) Field of Classification Search ................... 295/1, 295/7–8, 11, 21, 23, 27–28; 305/136–137, 305/193–197, 199; 301/95.102, 95.104, 301/95.106, 65, 63.107, 6.91
See application file for complete search history.

(56) References Cited

U.S. PATENT DOCUMENTS

| | | | | |
|---|---|---|---|---|
| 6,022 A * | 1/1849 | Cook | .......................... | 295/27 |
| 486,326 A * | 11/1892 | Cushing | ...................... | 295/28 |
| 564,214 A * | 7/1896 | Murphy | .......................... | 295/1 |
| 1,364,187 A * | 1/1921 | Dodge | .......................... | 295/27 |
| 1,952,488 A * | 3/1934 | Blunt | .......................... | 295/27 |
| 2,106,566 A * | 1/1938 | Hallquist | ...................... | 295/28 |
| 2,212,098 A * | 8/1940 | Heilig | .......................... | 295/28 |
| 2,231,816 A * | 2/1941 | Plaskitt et al. | ................. | 295/28 |
| 2,984,524 A * | 5/1961 | Franzen | ...................... | 305/194 |
| 3,107,115 A * | 10/1963 | Kastner | ...................... | 295/31.1 |
| 3,606,497 A * | 9/1971 | Giles | .......................... | 305/194 |
| 3,843,188 A * | 10/1974 | Kirschner | ...................... | 295/7 |
| 3,997,217 A * | 12/1976 | Bandet et al. | ............... | 301/5.1 |
| 4,349,234 A * | 9/1982 | Hartmann | ................... | 305/194 |
| 4,425,008 A * | 1/1984 | Weeks | .......................... | 305/137 |
| 4,538,860 A * | 9/1985 | Edwards et al. | ............ | 305/137 |
| 4,572,587 A * | 2/1986 | Komp et al. | ................. | 305/137 |
| 4,607,892 A * | 8/1986 | Payne et al. | ................. | 305/137 |
| 4,696,520 A * | 9/1987 | Henke et al. | .......... | 301/64.305 |
| 5,141,299 A * | 8/1992 | Korpi | .......................... | 305/137 |
| 5,413,407 A * | 5/1995 | Warner | ...................... | 305/197 |
| 6,206,492 B1 * | 3/2001 | Moser | .......................... | 305/194 |
| 6,325,462 B1 * | 12/2001 | Hummel et al. | .............. | 301/65 |
| 6,530,624 B1 * | 3/2003 | Stach | .......................... | 301/65 |
| 6,877,820 B1 * | 4/2005 | Langgartner | ................. | 301/65 |

FOREIGN PATENT DOCUMENTS

| | | | | |
|---|---|---|---|---|
| DE | 3428196 A1 * | 2/1986 | ................. | 305/193 |
| DE | 360974 A2 * | 4/1990 | ................. | 305/194 |
| GB | 2020236 A * | 11/1979 | ................. | 305/136 |

\* cited by examiner

*Primary Examiner*—Jason R. Bellinger
(74) *Attorney, Agent, or Firm*—Van Dyke, Gardner, Linn & Burkhart, LLP

(57) ABSTRACT

A hollow-shell road wheel for tracked vehicles includes a generally triangular, outer circumferential cavity formed by an outer rim and two wall members that extend radially inward at angles to a generally planar flange at approximately the mid-radius point of the hollow-shell road wheel. A series of hollow-shell road wheels assembled in a back-to-back configuration support the tracked-vehicle and act as guides for the track of the tracked-vehicle.

12 Claims, 4 Drawing Sheets

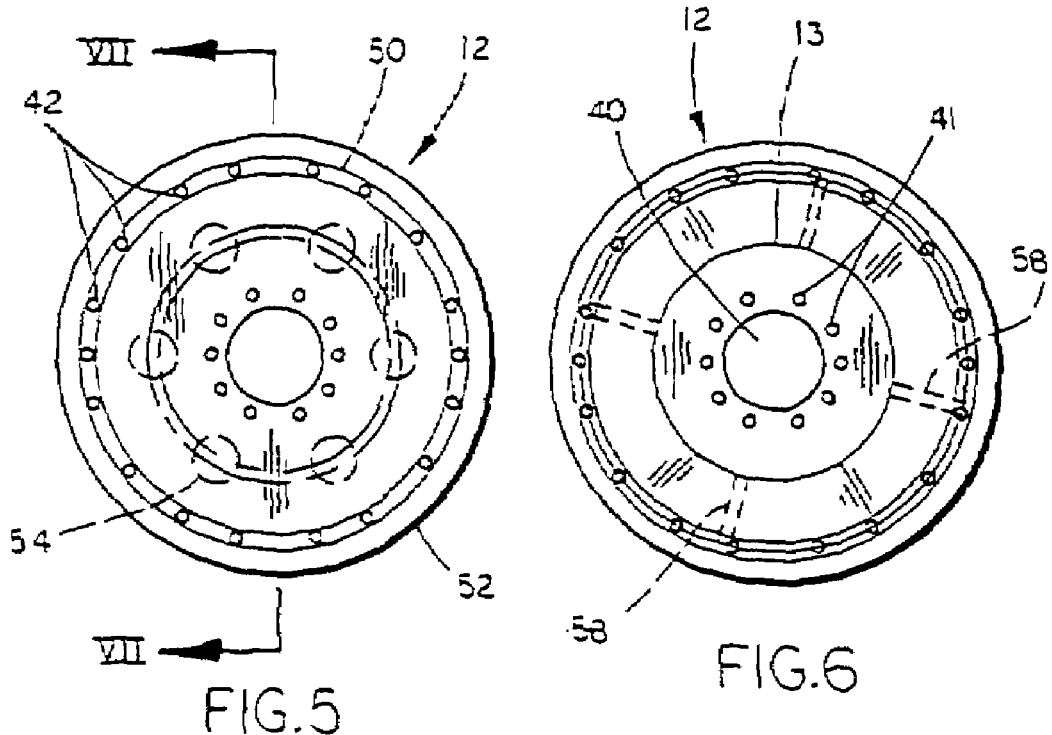
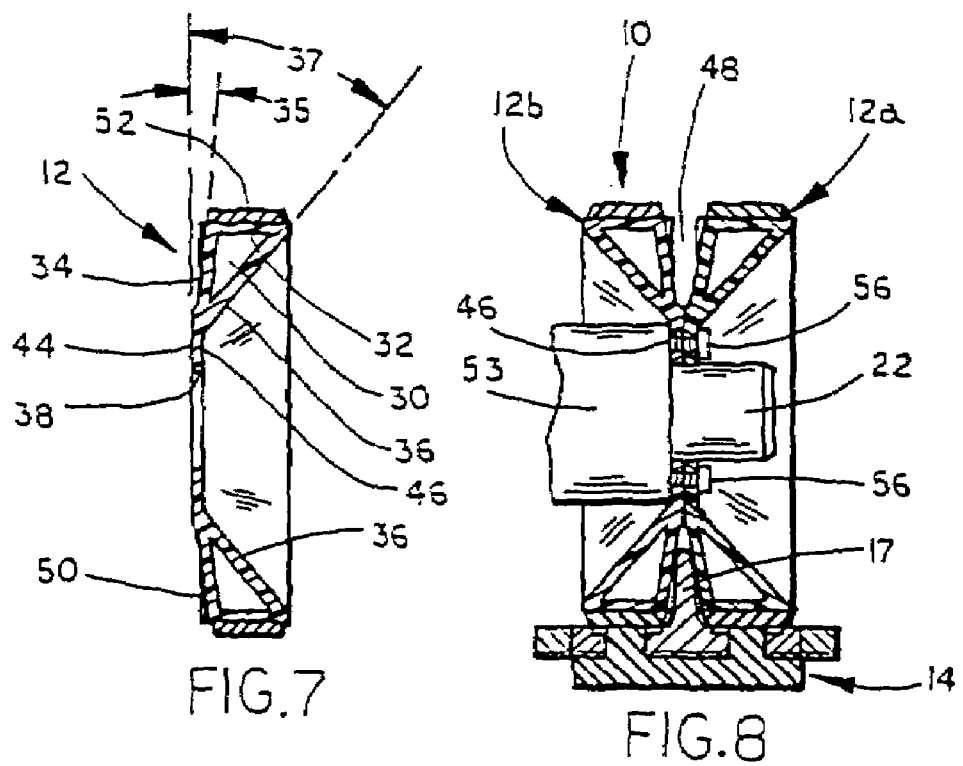

ROAD WHEEL FOR TRACKED VEHICLES

The present application claims benefit of U.S. provisional application Ser. No. 60/504,531, filed Sep. 19, 2003, which is herein incorporated by reference in its entirety.

BACKGROUND AND TECHNICAL FIELD OF THE INVENTION

The present invention is directed to wheels for supporting tracked-vehicles and, in particular, to the road wheels for tracked-vehicles that provide a rolling interface and support structure between the track and body of the vehicle.

Tracked-vehicles are a superior means of traversing varied off-road surfaces compared to vehicles equipped with conventional pneumatic tires. The tracks provide an increased driving surface and area of contact with the ground thereby enabling superior support of heavier vehicles on such varied terrain. In addition, tracks are more durable than conventional tires such that they are less susceptible to puncture by sharp or metallic objects.

Tracked-vehicles are utilized in military, forestry, and construction fields. Military vehicles employing track drive systems include, for example, the Advanced Amphibious Assault Vehicle (AAAV), the Bradley Fighting Vehicle, and Abrams tanks. Generally, the drive systems of such vehicles include a track, a drive sprocket, a track tensioner, and a series of road wheels that support the body of the vehicle and serve as a rolling guide interface to the track.

Existing road wheels for track drive systems on military vehicles are designed with a single-wall "dish" shape or an "I-beam" shape. Due to the weight of the tracked vehicles and the environments in which they are operated, these road wheels are subjected to high radial and lateral forces. When the vehicle is turning or traversing a slope at an angle, the lateral forces create particularly high stresses and strains on the road wheels. Significantly, as the wall thickness of an existing road wheel is reduced, the lateral strength decreases exponentially. Therefore, the high stresses and strains inflicted upon the road wheels dictate the use of a thicker wall and/or higher strength material for the existing single-wall shaped road wheels in order to prevent them from yielding and bending. This, in turn, results in road wheels of higher weight and/or cost.

The weight of a tracked-vehicle is always a concern, and particularly so for military vehicles, as weight affects power needs, fuel consumption, transportability, speed, and mobility of the vehicle. Further, present military combat situations involve fewer instances of heavy-duty tank conflicts. Therefore, there is an increasing need for more lightweight vehicles that are able to safely transport troops over a wide variety of urban, suburban, and rural terrains with a moderate level of armament and weaponry. It is essential that these tracked-vehicles, such as the AAAV and Bradley, be as light as possible in order to maximize performance and mobility.

Additionally, as financial resources are always limited regardless of the application in which the tracked-vehicle is operating, there is a strong motivation and emphasis to reduce costs without compromising the safety and ability of such vehicles. As such, road wheels of relatively high cost are not desired.

Therefore, a road wheel design is needed for track drive systems for vehicles that provides sufficient lateral and radial strength without necessitating heavier, thicker walls or costly higher strength materials.

SUMMARY OF THE INVENTION

In one form of the invention, a hollow-shell road wheel for tracked vehicles comprises a centrally located and generally flat flange connected to a circumferential outer cavity. In this form of the invention, the flange has a center hole for mounting the hollow-shell road wheel to a hub or suspension arm of a tracked-vehicle and the outer cavity has a rim at the outermost circumference of the road wheel.

A hollow-shell road wheel for tracked-vehicles according to another aspect of the invention includes a circumferential cavity formed by an outer rim and two wall members that extend radially inward to a flange at approximately the mid-radius point of the hollow-shell road wheel. The cavity increases the radial and lateral strength, enabling use of thinner rim, flange, and wall members, which in turn reduces the weight of the hollow-shell road wheel. The cavity also enables use of less costly, lower strength materials without compromising function of the hollow-shell road wheel.

In a preferred application, two hollow-shell road wheels of the present invention are mated in a back-to-back configuration and are, in turn, attached to a hub of a suspension arm of a tracked-vehicle. A series of hollow-shell road wheel pairs assembled in such a manner support the tracked-vehicle and act as guides for the track of the tracked-vehicle.

The cavity design of the hollow-shell road wheel increases its lateral and radial strength, thereby allowing use of lighter weight, lower cost alternative materials as compared to traditional road wheels, while still meeting stress, strain, and safety factor requirements. Additionally, the cavity design provides a more durable road wheel for tracked-vehicles. The lower cost, lighter weight, and increased durability of the hollow-shell road wheel improves the performance and lowers the cost of tracked-vehicles utilizing such wheels. Further, the road wheel of the present invention is self-cleaning because the closed nature of the circumferential cavity prevents the buildup of mud and debris as occurs with conventional wheel designs.

BRIEF DESCRIPTION OF THE DRAWINGS

FIG. 5 is a rear elevational view of a preferred embodiment of a hollow-shell road wheel;

FIG. 6 is a front elevational view of the hollow-shell road wheel of FIG. 5;

FIG. 7 is a side sectional view of the hollow-shell road wheel of FIG. 5 taken along the line VII—VII;

FIG. 8 is a sectional view of two hollow-shell road wheels mounted side-by-side on a suspension arm of a tracked-vehicle.

DESCRIPTION OF THE PREFERRED EMBODIMENT

The present invention is embodied in a road wheel for tracked-vehicles. In particular, the preferred embodiment of the present invention is intended for the military AAAV vehicle. However, the invention is readily applicable to the road wheels of any tracked-vehicle.

Figure 1:
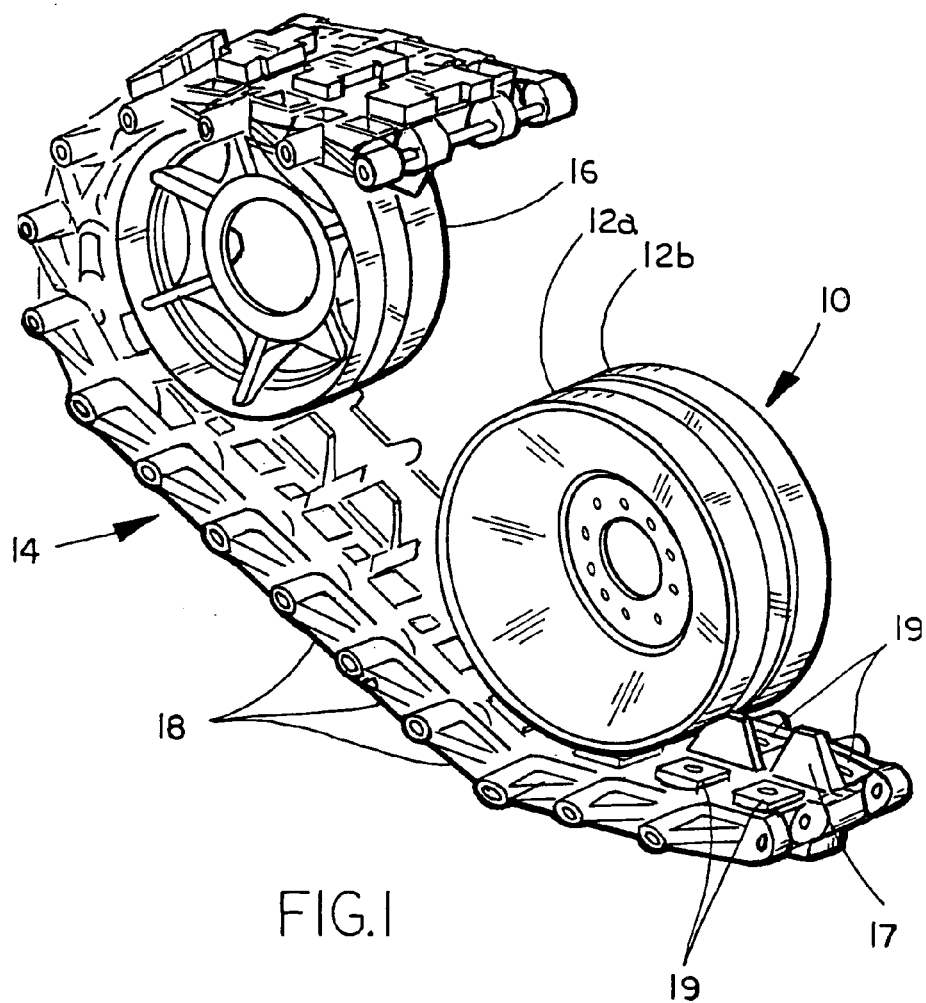
FIG. 1 is a side perspective view of a preferred embodiment of two hollow-shell road wheels of the present invention shown in relation to the track of a tracked-vehicle.
Figure 2:
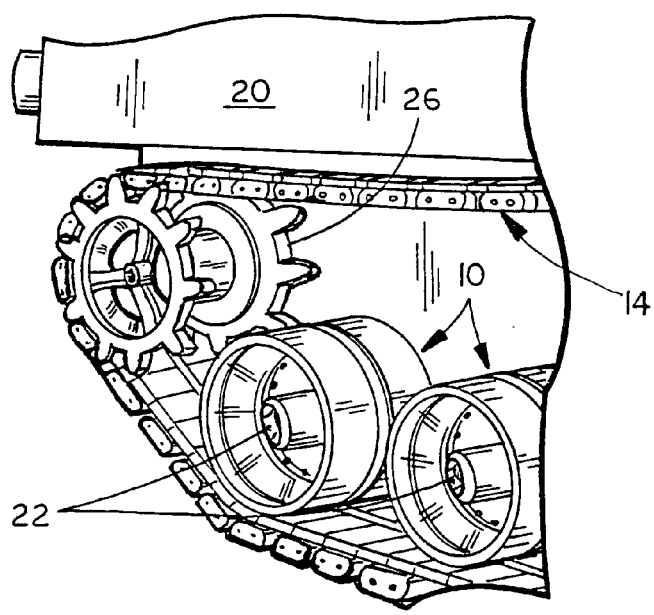
FIG. 2 is side perspective view of a portion of a tracked vehicle equipped with hollow-shell road wheels.

A preferred embodiment of the present invention can be seen in application in FIG. 1 as hollow-shell road wheel assembly 10. Assembly 10 includes an outwardly mounted, hollow-shell, road wheel 12a affixed to an identical, inwardly mounted, hollow-shell, road wheel 12b. In FIG. 1, hollow-shell road wheel assembly 10 is shown in relation to a portion of a track 14 of a tracked-vehicle and spoked wheel 16, where spoked wheel 16 may be either associated with a drive sprocket or a track tensioner. On the AAAV, the drive sprocket is forwardly mounted and the tensioner is rearwardly mounted. However, on other types of tracked vehicles, the tensioner may be located in the front and the drive sprocket in the rear. As seen in FIG. 2, the drive system of a tracked-vehicle 20 includes drive sprocket 26 and multiple, spaced sets of hollow-shell road wheel assemblies 10 that are each mounted to individual hubs (not shown) and suspension arms 22 of the tracked-vehicle 20. The hollow-shell road wheel assemblies 10 act as rollers for the track 14 and support the tracked-vehicle 20, enabling it to traverse uneven terrain.

Figure 4:
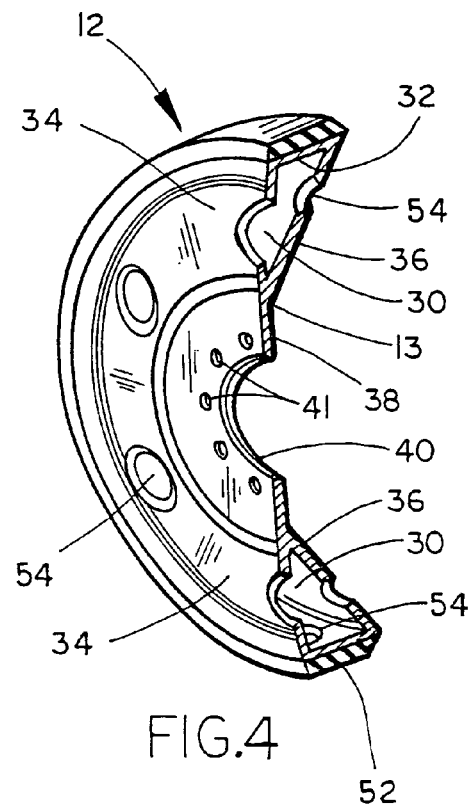
FIG. 4 is a sectional side perspective view of the hollow-shell road wheel of FIG. 3.

As seen in FIGS. 4 and 7, a preferred embodiment of the hollow-shell road wheel 12 of the present invention has an outer, circumferential cavity 30 having a generally triangular shape in section defined by rim 32, inner wall member 34, and outer wall member 36. Cavity 30 extends around the entire circumference of road wheel 12 from approximately the mid-radius 13 of road wheel 12 to its outer periphery. Inner wall member 34 forms an angle 35 of approximately 5 degrees with respect to flange 38. Outer wall member 36 forms an angle 37 of approximately 40 degrees with respect to flange 38. Angle 35 may be varied plus/minus approximately two degrees to optimize strength, clearance within guide area 48 (FIG. 8 discussed below), and/or manufacturability. Angle 37 is dependent upon, and therefore varies with, the width of track 14, as assembly 10 must be wide enough to provide sufficient support to track 14.

The cavity 30 design of hollow-shell road wheel 12 increases its lateral and radial strength such that alternative materials and manufacturing methods may be used, as compared to traditional road wheels, while still meeting stress, strain, and safety factor requirements. Significantly, the alternative materials and manufacturing methods provide a lighter road wheel, which is important to the overall performance of the tracked-vehicles 20. In addition to improving strength, the inclusion of cavity 30 provides a more durable road wheel; therefore, less maintenance is required on the tracked-vehicle 20 enabling increased vehicle up-time and reducing costs. The alternative materials and manufacturing methods also enable the road wheel to be produced at lower costs relative to traditional road wheels, thereby improving the overall economic viability of the tracked-vehicles 20 using the hollow-shell road wheels 12.

As seen in FIGS. 3 through 7, a hollow-shell road wheel 12 includes a geoerally planar, radially inner flange 38 that is generally perpendicular to rim 32. Flange 38 has shaft or suspension arm receiving hole 40 and hub mounting holes 41 and further includes mating or rear face 44 and exterior flange surface 46. On a hollow-shell road wheel assembly 10, as in FIG. 8, the mating or rear face 44 of flange 38 of the inwardly mounted hollow-shell road wheel 12b contacts the corresponding mating or rear face or surface 44 of outwardly mounted hollow-shell road wheel 12a. The exterior flange surface 46 of the inwardly mounted hollow-shell road wheel 12b contacts the hub 53 of a wheel support suspension arm 22 of tracked-vehicle 20 when the holes 40 are telescoped over a suspension arm 22. Fasteners 56 such as threaded bolts are then inserted through the spaced mounting holes 41 of the hollow-shell road wheel assembly 10 and screwed into the outer face of hub 53 such that assembly 10 is securely affixed to the tracked-vehicle 20. Alternatively, threaded bolts may extend out of hub 53 and lug nuts may be used to secure assembly 10 to tracked-vehicle 20.

As seen in FIG. 8, hollow-shell road wheel assembly 10 has a circumferential, generally V-shaped track guide area 48. The track guide area 48 is created by the angular relation of inner wall member 34 and flange 38, which forms angle 35 of approximately 5 degrees, on each of the two adjacent hollow-shell road wheels 12a, 12b that are in contact at their respective mating or rear faces 44. When affixed to a tracked-vehicle 20, track guide area 48 rides over the center guides 17 of track 14, thereby preventing lateral movement of the track and retaining track 14 on the tracked-vehicle 20. Additionally, as shown in FIG. 9, inner wall member 34 may be formed with a slightly concave profile to increase the clearance within track guide area 48.

Figure 9:
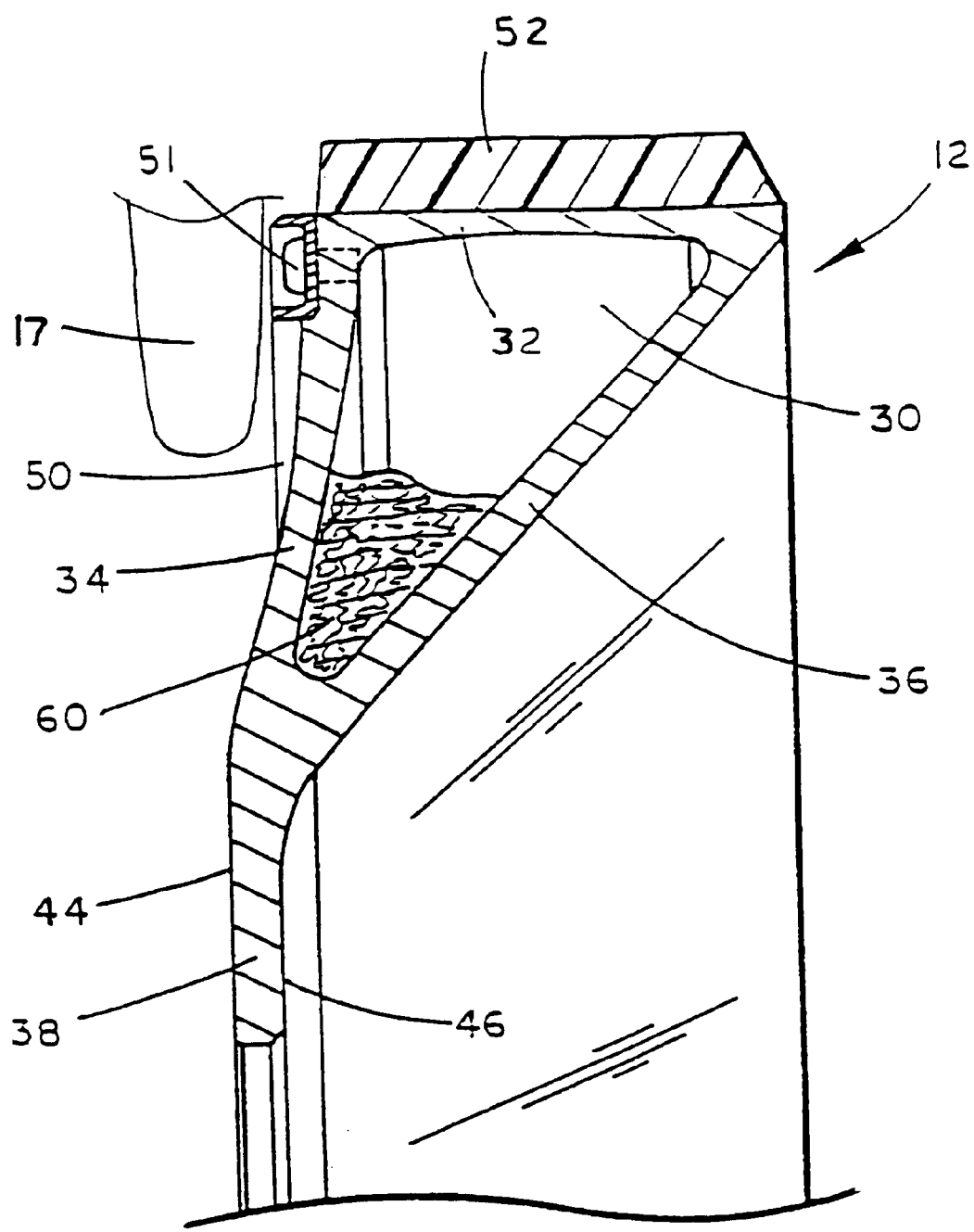
FIG. 9 is a side sectional view of a portion of the hollow-shell road wheel of the present invention, including a portion of metallic foam which may optionally be used in the wheel cavity.

As seen in FIGS. 5, 7, and 9, hollow-shell road wheel 12 preferably further includes wear ring 50 adjacent the outer periphery of the wheel and affixed near the outer edge of inner wall member 34. Wear ring 50 is recessed from a plane formed by mating or rear face 44 due to angle 35. When hollow-shell road wheels 12 are mounted in pairs, the wear rings 50 of an assembly 10 contact both sides of track center guide 17 such that deterioration of the highly stressed, hollow-shell road wheels 12a and 12b is prevented. Wear rings 50 may be made from materials such as steel, silicon carbide composites, titanium composites, or consist of a substrate covered by a plasma spray wear coating. Other materials with low wear characteristics may be used as well. As shown in FIG. 5, wear ring 50 and hollow-shell road wheel 12 include wear ring mounting holes 42 receiving threaded or other fasteners 51 such that the annular wear ring 50 is removable and replaceable. However, in an alternative embodiment, wear ring 50 may be permanently affixed to hollow-shell road wheel 12, such as by a welding process, without altering the function of wear ring 50. In a further alternative manufacturing method, wear ring 50 can be integrally attached to inner wall member 34 by insert molding during casting or molding as is described below.

Hollow-shell road wheel 12 preferably further includes molded elastomer support surface 52 secured to the circumferential outer surface of rim 32. Correspondingly, as seen in FIG. 1, each individual track shoe 18 of track 14 preferably includes two elastic pads 19, one on either side of center guide 17. The elastomer support surface 52 of hollow-shell road wheel 12 rolls over the elastic pads 19 of track 14 when the tracked-vehicle 20 is in motion. Surface 52 and elastic pads 19 thereby provide a wear surface, which prevents deterioration of the hollow-shell road wheel 12 and provides shock absorbency and noise attenuation characteristics when in use.

The elastomer support surface 52 of hollow-shell road wheel 12 may be made from elastic materials such as rubber or polyurethane. One embodiment of the elastomer support surface 52 utilizes rubber of approximately 70 to 80 Shore A hardness. An alternative embodiment of the elastomer support surface 52 utilizes polyurethane of approximately 85 to 98 Shore A hardness. One method of affixing the elastomer support surface 52 onto the hollow-shell road wheel 12 is by casting. In this method, an adhesive is applied to rim 32 after it has been sand blasted. The hollow-shell road wheel 12 is then inserted into a suitable mold assembly and the hollow-shell road wheel 12, adhesive, and mold assembly are pre-heated. An elastomeric material in liquid form is then caused to fill the mold assembly, thereby bonding to the hollow-shell road wheel 12.

As discussed, the hollow-shell road wheel 12 may be made from alternative materials relative to traditional road wheels. A preferred embodiment of the hollow-shell road wheel 12 may be made from aluminum alloys such as A357, B206, or from the 6000 or 7000 series of alloys. The hollow-shell road wheel 12 may also be made from magnesium or titanium alloys. The higher the strength of the alloy that is used, the thinner the rim 32, inner wall member 34, outer wall member 36, and flange 38 may be made, thereby further reducing the overall weight of the hollow-shell road wheel 12 while maintaining the required strength and stiffness.

Figure 3:
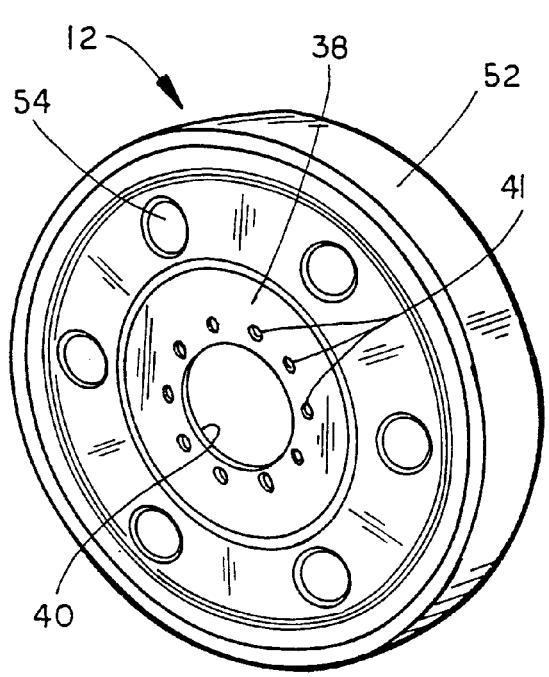
FIG. 3 is a rear side perspective view of a preferred embodiment of a hollow-shell road wheel of the present invention.

A preferred embodiment of the hollow-shell road wheel 12 is made by casting, such as by a semi-permanent mold process or by a lost foam casting process. In a semi-permanent mold process, cavity 30 is formed using an internal sand core and the molten alloy is injected into a mold around the internal sand core. In this method, the hollow-shell road wheel 12 requires casting material exit holes 54, as seen in FIGS. 3, 4, and 5, which provide an outlet for removing the sand after completion of casting. The exit holes 54 may be located on one of, or some combination of, inner wall member 34, outer wall member 36, or rim 32. FIG. 5 shows exit holes 54 on inner wall member 34, and FIG. 4 shows exit holes 54 on both inner and outer wall members 34, 36, as well as on rim 32. The inclusion of exit holes 54 on inner wall member 34, outer wall member 36, or rim 32 affects the strength of hollow-shell road wheel 12, thereby generally necessitating an increase in the thickness of the structure including the exit holes 54.

In the lost foam casting process, a hollow-shell road wheel model is first made out of polystyrene and then dipped into a ceramic slurry. The coated polystyrene model is placed into a flask or mold casing that is then filed with sand. When the molten alloy is introduced to the sand mold, the polystyrene evaporates and the molten alloy takes the shape of the polystyrene model. In this process, smaller or fewer exit holes 54 are required.

Alternately, road wheels 12 can be made by other techniques including laser deposition, selective laser sintering, direct metal deposition, or other rapid prototyping techniques. These techniques would allow production of a road wheel 12 including a hollow cavity 30 of essentially the same structure described above but without core or exit holes such as those shown at 54. Further, these production methods could allow the inclusion of ribs within cavity 30 such as those shown at 58 in FIG. 6 for further weight optimization of the structure using such fabrication methods. Ribs 58 can be of either the sprocket type or truss type. If sprocket type ribs are used, they would extend radially within cavity 30 from the inside surface of inner wall member 34 to the inside surface of outer wall member 36. If truss type ribs are included, they would extend radially within cavity 30 from the inner surface of inner wall member 34 to the inner surface of outer wall member 36 and also engage the inner surface of rim 32 to form a continuous, triangular brace or truss within the cavity. Inclusion of ribs 58 as described above would allow the use of thinner inner wall members 34, outer wall members 36 and rims 32 while maintaining strength for wheel 12.

Alternately, road wheels 12 can also be manufactured by centrifugal casting techniques, which would still require a core to produce cavity 30. In addition to sand type cores, metallic foams such as shown partially at 60 in FIG. 9 can also be used as a core material, where in actual use the metallic foams would fill the entire cavity 30. Metallic foam 60 would remain within cavity 30 such that exit holes 54 would not be required. However, at least one support hole would be needed to enable metallic foam 60 to be positioned such that the material used to construct road wheel 12 could be cast around metallic foam 60. If metallic foams are used as a core material, they would provide an internal, lightweight stiffening element for the wheel, along with vibration dampening and/or energy absorption. Use of the metallic foams is an alternate technique for further reducing the weight of the wheel since the use of metallic foams as a core material would allow the use of thinner wall members 34, 36 and a thinner rim 32.

Yet further alternative production methods for road wheel 12 may be utilized for lightweight vehicles using tracks 14 such as those described above. In such designs, wheels 12 could be cast using plastic materials such as Nylon 66 or fiber reinforced plastic materials such as glass, Kevlar or graphite fiber reinforced polyester resin.

The combination of material and manufacturing method utilized to make the hollow-shell road wheel 12 is dependent on various parameters, as is readily apparent to one of ordinary skill in the art. The parameters considered include the intended production volumes, corrosion resistance of the material, desired wall thickness, and micro-structure of the road wheel as there are casting risks involved with thinner walls.

The design of the hollow-shell road wheel 12 including a circumferentially outer cavity 30 and a radially inner generally planar flange 38 creates a road wheel of generally equivalent radial and lateral strength of existing single walled road wheels while having thinner walls and being made of lower strength alloys. In addition, the design including cavity 30 improves the durability of the hollow-shell road wheel 12. The reduced weight of the hollow-shell road wheel 12 enhances the performance of the tracked-vehicle 20. The ability to utilize lower strength, and less costly, alloys without sacrificing strength improves the economic viability of the tracked-vehicle 20.

The above is a description of the preferred embodiments. One skilled in the art will recognize that changes and modifications may be made without departing from the spirit of the disclosed invention, the scope of which is to be determined by the claims which follow and the breadth of interpretation that the law allows.

What is claimed is:

1. A hollow-shell road wheel for tracked-vehicles comprising:
 a peripheral rim member, said peripheral rim member including a first edge and a second edge;
 a flange member, said flange member including a mating surface and an exterior flange surface opposite said mating surface;
 a first cavity wall member, said first cavity wall member being attached to said peripheral rim member at said first edge; and a second cavity wall member, said second cavity wall member being attached to said peripheral rim member at said second edge;

said first cavity wall member and said second cavity wall member being attached to said flange member;

said first cavity wall member, said second cavity wall member, and said peripheral rim member defining a cavity;

wherein said second cavity wall member and said flange member form a conical section, and wherein a wear ring is affixed to said first cavity wall member proximate to said first edge of said peripheral rim member, and wherein said first cavity wall member and said wear ring have a plurality of circumferentially located holes adapted to receive a plurality of fastening elements to secure said wear ring to said first cavity wall member such that said wear ring is removable and replaceable.

2. The hollow-shell road wheel of claim 1, wherein said cavity is triangular in section.

3. The hollow-shell road wheel of claim 1, wherein said first cavity wall member is angularly attached to said flange member such that said wear ring is recessed from a plane formed by said mating surface of said flange member.

4. The hollow-shell road wheel of claim 1, wherein said flange member is fixed in a plane substantially perpendicular to said peripheral rim member.

5. The hollow-shell road wheel of claim 1, wherein an elastic material is fixedly secured to said peripheral rim member.

6. The hollow-shell road wheel of claim 1, wherein said flange member has a plurality of circumferentially located mounting holes.

7. The hollow-shell road wheel of claim 1, wherein said flange member has a center hole.

8. The hollow-shell road wheel of claim 1, wherein said cavity has a plurality of circumferentially located holes adapted to allow casting core material to be removed, said holes being located in at least one of said first cavity wall member, said second cavity wall member, and said peripheral rim member.

9. The hollow-shell road wheel of claim 1 including at least one rib in said cavity for strengthening said wheel.

10. The hollow-shell road wheel of claim 1 including metallic foam within said cavity for strengthening said wheel.

11. The hollow-shell road wheel of claim 1, wherein said wheel is constructed of a material selected from the group consisting of an aluminum alloy, magnesium alloy, titanium alloy, plastic, and fiber reinforced plastic.

12. The hollow-shell road wheel of claim 1, wherein said first cavity wall member forms an angle of approximately five degrees with respect to said flange member and said second cavity wall member forms an angle of approximately forty degrees with respect to said flange member.

* * * * *